(12) United States Patent
Sander (10) Patent No.: US 6,977,364 B2
(45) Date of Patent: Dec. 20, 2005

(54) SYSTEM AND METHOD FOR COMPENSATING FOR DARK CURRENT IN PHOTOSENSITIVE DEVICES

(75) Inventor: Willy M. Sander, Stamford, CT (US)

(73) Assignee: ASML Holding N.V., Veldhoven (NL)

( * ) Notice: Subject to any disclaimer, the term of this patent is extended or adjusted under 35 U.S.C. 154(b) by 304 days.

(21) Appl. No.: 10/627,638

(22) Filed: Jul. 28, 2003

(65) Prior Publication Data
US 2005/0023444 A1 Feb. 3, 2005

(51) Int. Cl.$^7$ .................. H01J 40/14; H01L 27/00; H04N 9/64
(52) U.S. Cl. ............. 250/214 C; 348/243; 250/208.1
(58) Field of Search .................. 250/214 C, 239, 250/208.1; 348/241, 243, 244, 245, 300; 355/53; 430/5

(56) References Cited

U.S. PATENT DOCUMENTS

| | | | |
|---|---|---|---|
| 4,984,058 A | 1/1991 | Miyaoka et al. ............. 257/773 |
| 5,923,370 A * | 7/1999 | Miethig et al. ............. 348/320 |
| 6,433,326 B1 * | 8/2002 | Levine et al. ............. 250/208.1 |
| 6,525,769 B1 * | 2/2003 | Thomas et al. ............. 348/243 |
| 2003/0214590 A1 * | 11/2003 | Matherson ............. 348/243 |

FOREIGN PATENT DOCUMENTS

| JP | 57-42275 A | 3/1982 |
|---|---|---|
| WO | WO 89/10037 A1 | 10/1989 |

OTHER PUBLICATIONS

English abstract for JP57042275, 1 page, provided by esp@cenet database.
JLW, 20 pages.
CCD57-10 High Performance CCD Sensor, e2v Technologies Limited, 12 pages (Apr. 2003).
CCD77-00 Back Illuminated High Performance IMO Device, Marconi Applied Technologies Limited, 12 pages (Jan. 2002).
CCD Primer MTD/PS-0218 Charge-coupled Device (CCD) Image Sensors, Eastman Kodak Company, 13 pages (May 29, 2001).
Titus, H., "Imaging Sensors That Capture Your Attention," Sensors, an ADVANSTAR publication, vol. 18, No. 2, 5 pages (Feb. 2001).

* cited by examiner

Primary Examiner—David Porta
Assistant Examiner—Don Williams
(74) Attorney, Agent, or Firm—Sterne, Kessler, Goldstein & Fox P.L.L.C (57) ABSTRACT

A method is used to perform dark current compensation in a sensor (e.g., a CCD or CMOS sensor). A first and second array of devices (e.g., pixels) in the sensor are used to determine a first dark current value. The first array of pixels in the sensor receives impinging light and generates optical energy values therefrom. The second array of pixels in the sensor are used to determine a second dark current value at substantially a same time as the generating of the optical energy values. The second array of devices being non-sensitive to the impinging light. The first and second dark current values are used to compensate the optical energy values.

30 Claims, 8 Drawing Sheets

SYSTEM AND METHOD FOR COMPENSATING FOR DARK CURRENT IN PHOTOSENSITIVE DEVICES

BACKGROUND OF THE INVENTION

1. Field of the Invention

The present invention is related to adjusting optical energy values generated by devices on a sensor for dark current.

2. Background Art

Charge coupled device (CCDs) sensors and complementary metal oxide semiconductors (CMOS) sensors can be used to detect light over a range of many wavelengths in many diverse types of optical systems. The sensors are semiconductors that include an array of devices (called "pixels") that absorb optical energy from impinging light and convert it to electrons, which are stored in a capacitor. The sensors generate optical energy values (e.g., electrons) proportional to the optical energy impinging on each pixel. Sensor pixels also generate dark current, which is an unwanted signal (e.g., noise) associated the sensor due to the presence of electrons generated by thermal and leakage effects. Dark current is temperature dependent, and can be reduced by decreasing the operating temperature of the sensor. Dark current is present and can also be localized in individual hot pixels. A value of the dark current at any one temperature will not be the same for each pixel in the array due to process variations. Dark current, as its name implies, adds an unwanted component raising the black level of the output signal. The net effect is to add an unwanted component to desired signal and this effect needs to be compensated for to generate accurate and optimal optical image values.

There are typically three types of CCD technologies: full frame, transfer frame, and interline. A basic description of these architectures can be found in *CCD Primer MTD/PS-0218 Charged Coupled Device (CCD) Image Sensors*, Eastman Kodak Company-Image Sensor Solutions, Revision No 1, May 29, 2001.

To accurately obtain a measure of the received optical energy, a dark current adjustment has to be made to the optical energy values. Conventionally, a calibration frame accomplishes this adjustment across the entire sensor before receiving the impinging light. The calibration frame is subsequently subtracted from the corresponding optical energy values generated based on the impinging light. However, the number of dark current generated electrons is proportional to exposure time and affected by temperature variations. Hence, the dark frame calibration optical energy values need to be taken using the same time duration as used by the measurement frame. Temperature fluctuations between sensing of the measurement frame optical energy values and the calibration frame adversely effect the desired adjustment. Thus, the sensor needs to be maintained at a constant temperature equal to that of the calibration frame. If this does not occur, the calibration frame cannot be accurately used to compensate for dark current.

This phenomenon becomes especially significant in systems that are used to measure very low light energy levels. These systems require long exposure times and thus accumulate a significant number of dark current generated electrons.

Typically, a calibration frame has to be taken often enough to ensure the compensation for dark current is accurate. This adds a time equal to the exposure time to the overall operation. Periodically stopping a lithography system, for example, to capture a calibration frame can be costly in terms of lost time and lost production, due to lower throughput. This is also true for any system used to capture optical measurements in low light energy levels.

Therefore, what is needed is a compensation method to compensate optical energy values for dark current without affecting throughput of a production system.

BRIEF SUMMARY OF THE INVENTION

Embodiments of the present invention provide a system and method that compensate for dark current. The system and method: (a) determine a first dark current value from a first and second array of photosensitive devices; (b) receive optical energy onto the first array of photosensitive devices; (c) determine an optical energy value for each element of the first array based on the received optical energy; (d) determine a second dark current value from the second array of devices at substantially a same time as step (c), the second array of devices being non-sensitive to the optical energy; and (e) adjust the optical energy value as a function of the first and second dark current values.

Other embodiments of the present invention provide a system and method for compensating for dark current in a charge coupled device or a complementary metal oxide semiconductor device. The system and method (a) determine a first dark current value from a first and second portion of the charge coupled device; (b) determine optical energy values from the first portion of the charge coupled device correlating to received optical energy; (c) determine a second dark current value based on the second portion of the charge coupled device at substantially a same time as step (b), the second portion being non-sensitive to the optical energy; and (d) adjust the optical energy values as a function of the first and second dark current values.

Still other embodiments of the present invention provide a system and method for correcting for wavefront aberrations in a lithography system. A shearing interferometer can be temporarily installed in a lithography system by replacing the reticle with a suitable source module and including a charge coupled device with a suitable grating onto the wafer stage. The previously described method can be used to determine a first dark current value from the first and second arrays of devices, generating optical energy values from light having the wavefront aberrations received at the first array of devices, determining a second dark current value from the second array of devices, adjusting the optical energy values based on the first and second dark current values, and generating control signals based on the adjusted optical energy values that are used to control an optical device in the lithography system to compensate for the wavefront aberrations.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Overview

Embodiments of the present invention provide for dark current compensation in a sensor (e.g., a CCD or CMOS sensor). A first array of devices (e.g., pixels) in the sensor receives impinging light and generates optical energy values therefrom. A second array of pixels in the sensor are used to determine dark current at substantially a same time as the generating of the optical energy values. The second array of devices is not sensitive to the impinging light. The dark current is subtracted from the optical energy values to generate adjusted optical energy values taking into consideration the dark current.

In certain production systems, such as lithography systems, the adjusted optical energy values can be used to generate control signals. The control signals can be used to correct for wavefront aberrations of the impinging light. For example, a Zernike polynomial can be generated from the adjusted optical energy values and used to generate control signals. The control signals can then be used to control a deformable optical element (e.g., a deformable mirror), which can alter the light to correct for the aberrations.

The above system and method can also be used in scientific, consumer or commercial grade cameras. For example, they can be used in cameras used for nightsurveillance, cameras designed for scientific instrumentation, space applications, space telescopes, or the like. This is because a feature of the above systems and methods is that the dark field compensation can be used to compensate for low light level environments. It is to be appreciated that the systems and methods described above and below can be used in many other applications employing a sensor.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Charge Coupled Device Architectures

Figure 1:
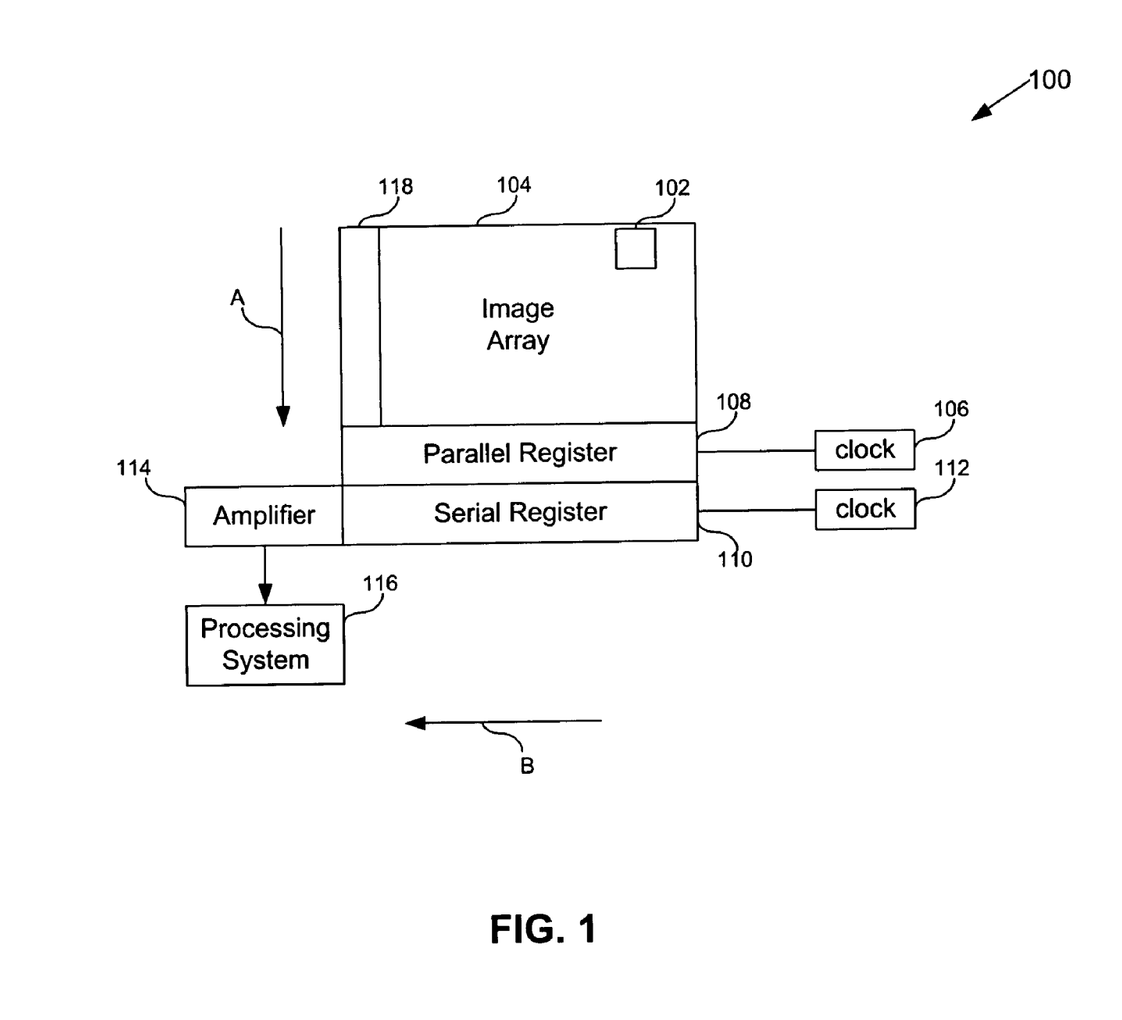
FIG. 1 shows a full frame CCD architecture according to embodiments of the present invention.

FIG. 1 shows system 100 according to embodiments of the present invention. System 100 can be a CCD using full frame architecture technology. Optical energy collected from light impinging on pixels 102 in an image array 104 (e.g., a frame) is used to generate optical energy values (e.g., electrons, analog signals, image information, scene information, etc.) that are generated by the pixels. Optical energy values are based on characteristics of the impinging light and the parameters associated with the impinging light (e.g., integration time, etc.), such as charge that is formed in pixels 102 correlating to how much light was received during a specified time period.

System 100 can quantize the information into discrete elements, (e.g., per pixel 102). Respective rows of the quantized information are shifted in parallel under control of clock 106 using parallel register 108 in the direction of arrow A to serial register 110. Then, the information is shifted serially in the direction of arrow B under control of clock 112 through serial register 110 to amplifier 114. Amplifier 114 amplifies the information signal before transmitting it to processing system 116, which processes the information signal. This operation can be repeated until all rows are transferred from image array 104. The processed information signal can then be used to generate an image or evaluate the information signal for other reasons, e.g., to determine wavefront aberrations, to determine characteristics of the system 100, etc.

It is to be appreciated that although the parallel register 108 and serial register 110 are shown as separate devices with separate clocks, they can be a single device with a single clock, as is known in the relevant arts. This alternative configuration is contemplated within the scope of the present invention.

It is to be appreciated that optical sensor technology utilizing CCDs can be used for varying reasons, all of which are contemplated within the scope of the present invention. The above-described operation is sometimes called readout or similar terminology in the art.

In one embodiment, a section 118 of image array 104 can be non-sensitive to impinging light. Section 118 can be used to sample a dark current value (e.g., determine a second dark current value) for a particular time period, as will be described in more detail below. Making section 118 non-sensitive can be accomplished by blocking, shielding, filtering, using a non-sensitive pixel, or the like. After using section 118 to sample the dark current, extrapolation can be used to generate a dark current correction factor values for all pixels 102 in image array 104 for the particular time period. It is to be appreciated that section 118 can be anywhere within imaging array 104, and not just in a peripheral column as shown.

Figure 2:
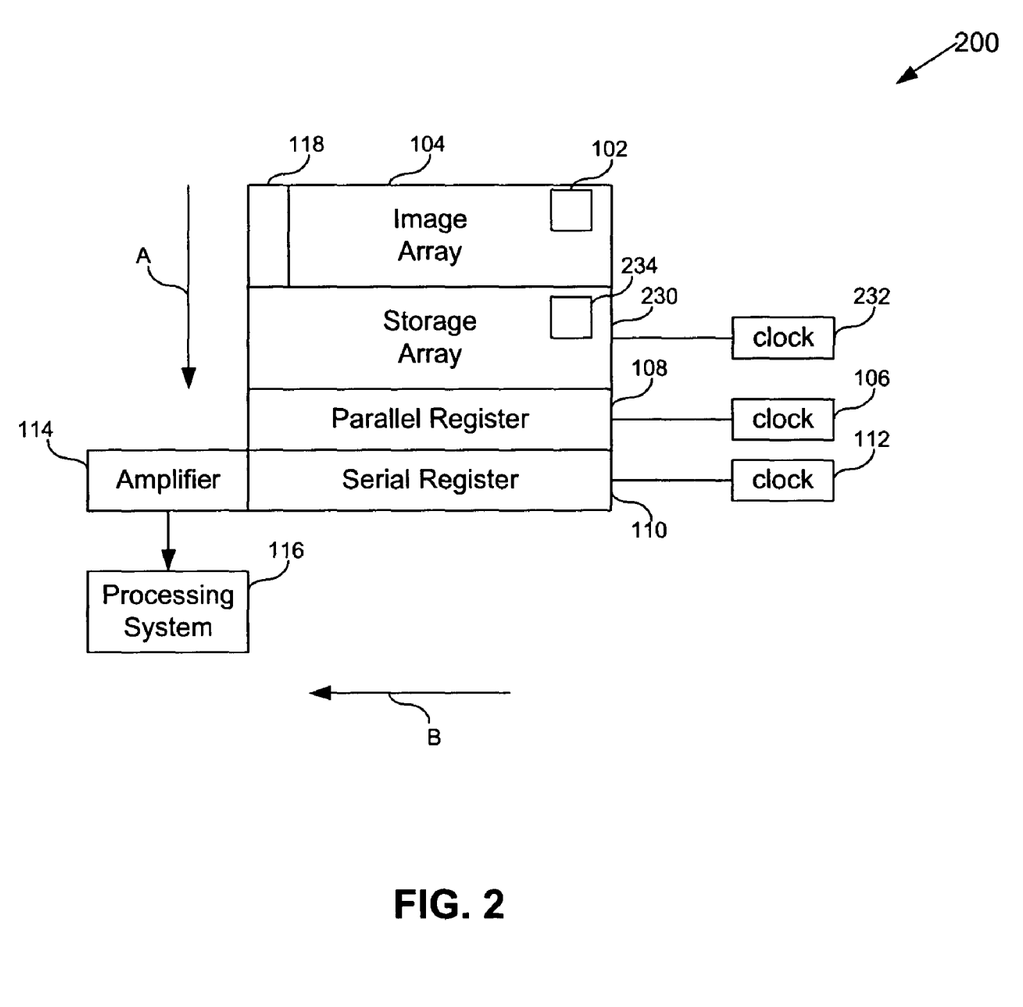
FIG. 2 shows a frame transfer CCD architecture according to embodiments of the present invention.

FIG. 2 shows a system 200 according to embodiments of the present invention. System 100 can be a CCD using frame transfer architecture technology. A main difference between system 200 and system 100 is an addition of a storage array 202 (e.g., a parallel register) under control of clock 204. Storage array 202 can have a same amount of storage devices 206 as there are pixels 102 in imaging array 104. In operation, information can be shifted very quickly from image array 104 to storage array 202. Then, parallel register 108 shifts rows of the information via serial register 110 and amplifier 114 to processing system 116. This arrangement can provide for a continuous or shutterless/strobeless operation, which can increase frame transfer rate. However, requiring two arrays can increase cost compared to full frame architecture technology, and it requires a larger overall system.

Figure 3:
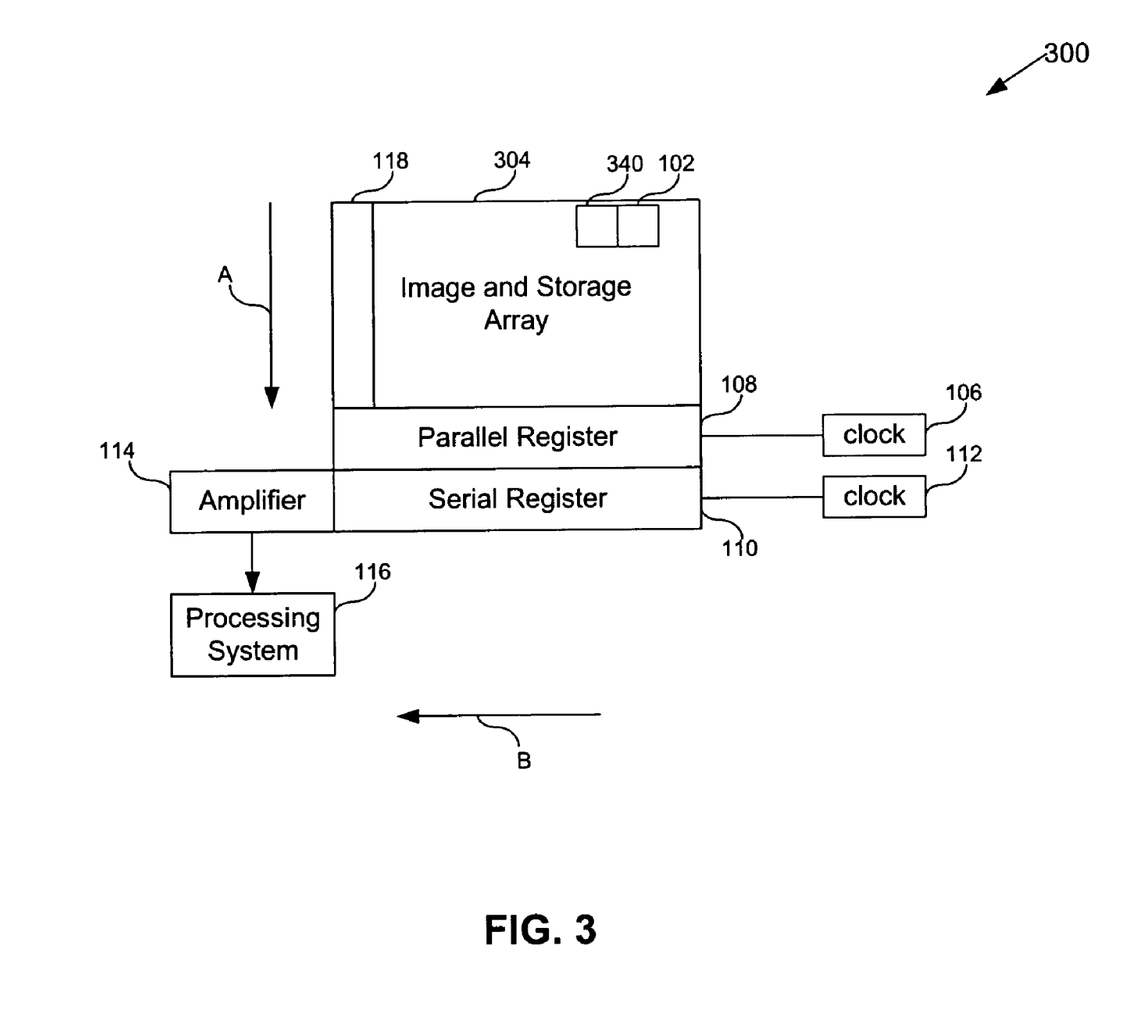
FIG. 3 shows an interline architecture CCD architecture according to embodiments of the present invention.

FIG. 3 shows a system 300 according to embodiments of the present invention. System 300 can be a CCD using interline architecture technology. A main difference between system 300 and system 100 is that image array 304 can include a storage array having storage elements 340 (e.g., light shielded or non-sensitive pixels) adjacent their corresponding pixels 102. This allows for a separation between photodetection and readout functions. All signals collected in pixels 102 are transferred at substantially a same time to pixels 340. Similar to system 200, during readout pixels 102 are capturing a next frame of information, which allows for continuous operation and a relatively high frame rate.

Dark Current Compensation Methods

Figure 4:
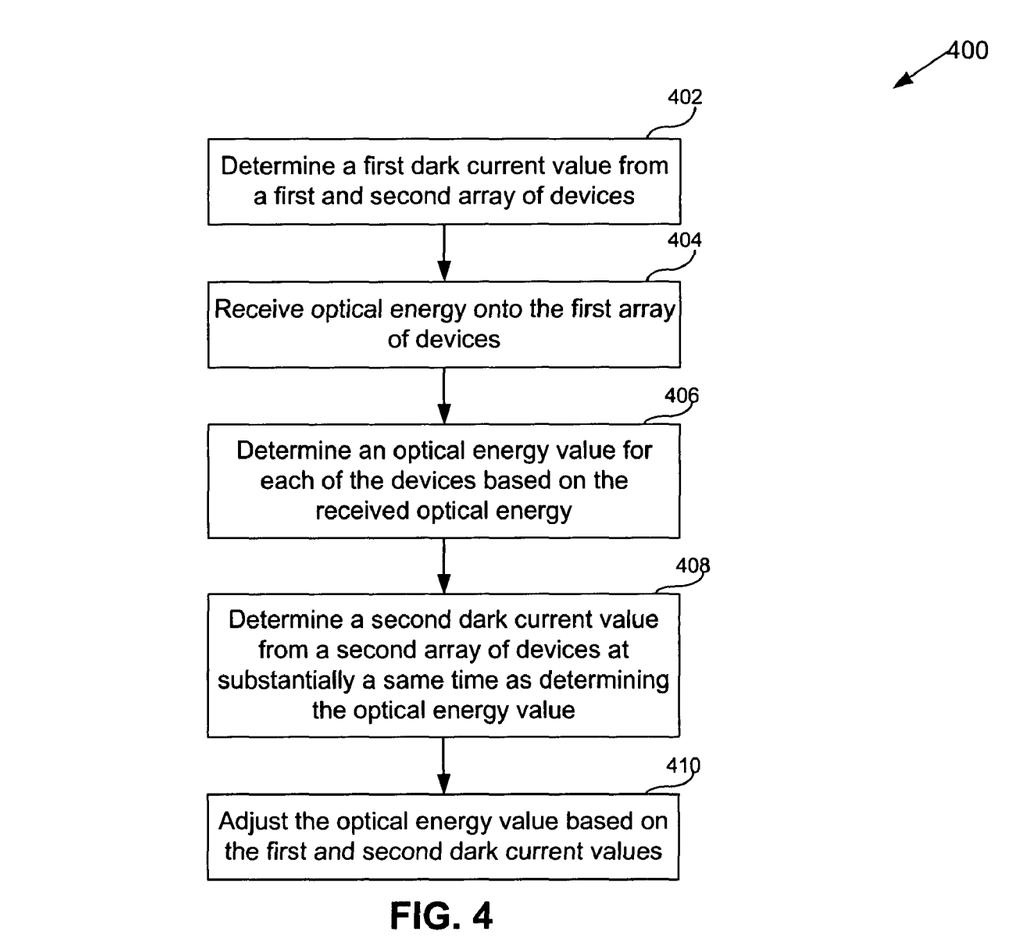
FIGS. 4 and 5 shows flowcharts depicting methods according to various embodiments of the present invention.

FIG. 4 shows a flowchart depicting a method 400 according to an embodiment of the present invention. Method 400 can take place in processing system 116, or remote to the systems 100, 200, or 300. In step 402, a first dark current value is determined using a first and second array of devices. In step 404, optical energy is received on the first array of devices. In step 406, an optical energy value is determined for each of the first array of devices based on the received optical energy. In step 408, a second dark current value is determined from the second array of devices at substantially a same time as determining the optical energy value. In step 410, the optical energy value is adjusted (e.g., compensated) as a function of the first and second dark current values.

Figure 5:
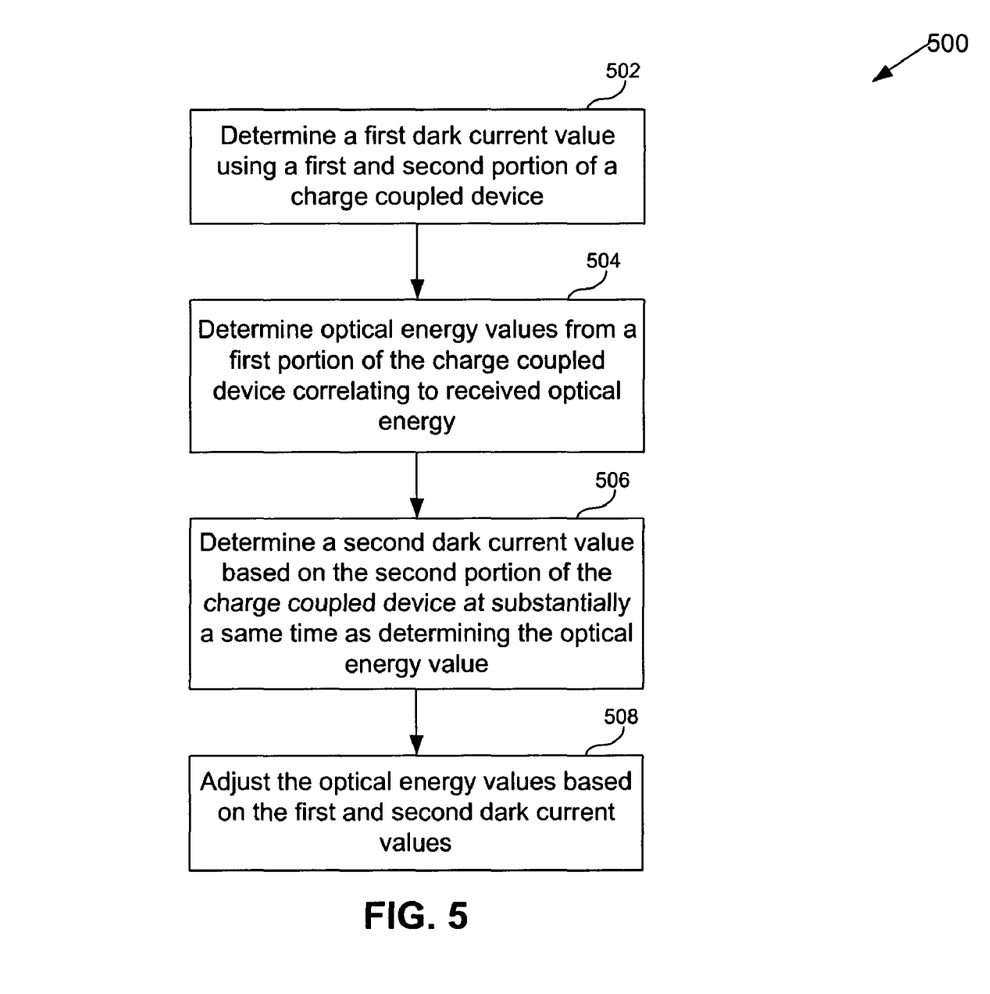

FIG. 5 show a flowchart depicting a method 500 according to embodiments of the present invention. In step 502, a first dark current value is determined using first and second portions of a charge coupled device. In step 504, optical energy values are determined from the first portion of the charge coupled device correlating to received optical energy. In step 506, a second dark current value is determined based on the second portion of the CCD at substantially a same time as determining the optical energy value. In step 508, the optical energy values are adjusted as a function of the first and second dark current.

The first dark current value can correlate to a spatial distribution of dark current over the first and second arrays. The second dark current value can be based on a change in dark current over time based on leakage, temperature, and other factors. The second dark current value can be used to provide a percentage change over time of the dark current for the first and second arrays of devices. The adjusting step can extrapolate the dark current found in the sampling of the second array of devices to be used as the dark current for the first array of devices. This a because the dark current changes a given percentage per degree of temperature rise and the dark pixels (e.g., the second array) can be used to obtain information to determine the percentage. Then, the percentage can be used as correlating to a same percentage change in the first array of devices.

In some embodiments, additional full-frame dark current measurements can be taken to account for other second order effects. This occasional and not periodic full frame re-calibration should not add significantly to the throughout penalty.

Example Embodiment: Lithography

Figure 6:
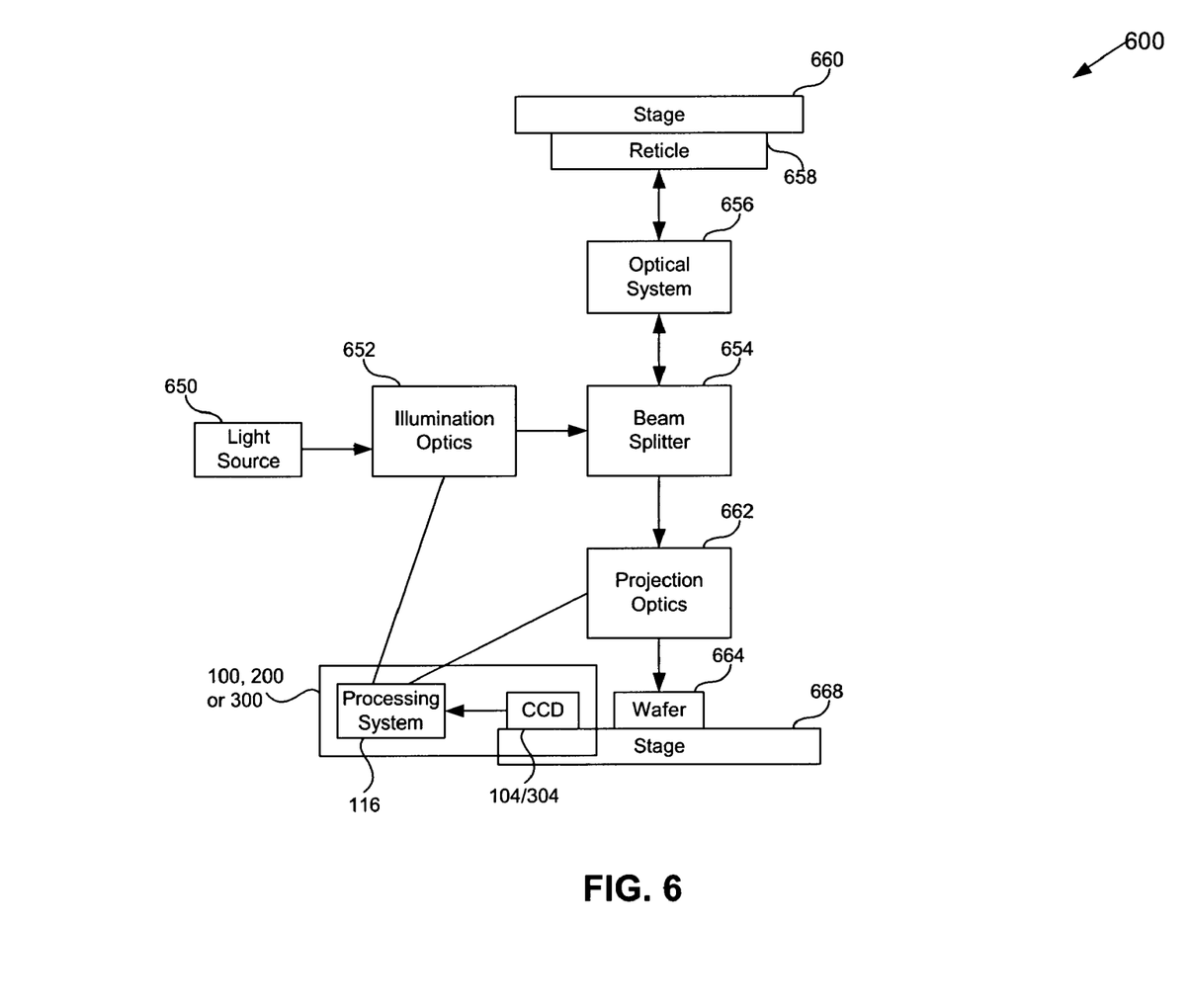
FIG. 6 shows a lithography system according to embodiments of the present invention.

FIG. 6 shows a system 600 according to embodiments of the present invention. For example, system 600 can be a lithography system. Light from light source 650 is transmitted through illumination optics 652 onto a beamsplitter 654 to be directed through optical system 656 and reflected from a reticle 658 (e.g., a special reticle designed as a source module for this application) on stage 660. Reflected light from reticle 658 passes through optical system 656, beamsplitter 654, and projection optics 662 to pattern wafer 664 on stage 668. As stage 668 scans wafer 664, imaging array 104 or 304 in system 100, 200, or 300, will receive light instead of wafer 664. Although shown coupled on a left side of stage 668, system 100, 200, or 300 can be coupled in various places on or near stage 668, all of which are contemplated within the scope of the present invention. Also, although not specifically shown, a grating or similar device can be placed in front of the system 100, 200, or 300, as would be appropriate is the system 100, 200, or 300 is used in conjunction with a shearing interferometer.

A wavefront (e.g., an interferometric measurement) of this light can be imaged, measured, and/or processed to determine its characteristics using processing system 116. This processing can be used to determine aberrations in the wavefront or any other characteristic known in the imaging arts. Based on this, a Zernike polynomial can be generated that can be used to determine control signals for controlling a deformable optical device (not specifically shown) (e.g., a deformable mirror) in one or both of the illumination optics 652 or projection optics 662. The wavefront aberrations can be substantially compensated for through controlling of the deformable optical device.

In order to make dark current measurement in the above lithography embodiment, it might be necessary interrupt the throughput to replace a patterning reticle with the special reticle 358. Then, system 100, 200, or 300 is scanned one or more times to obtain data. The Zernicke polynomials can then be extracted from this data. As discussed above, when using a shearing interferometer, a CCD in system 100, 200, or 300 can have a grating adjacent thereto.

Figure 7:
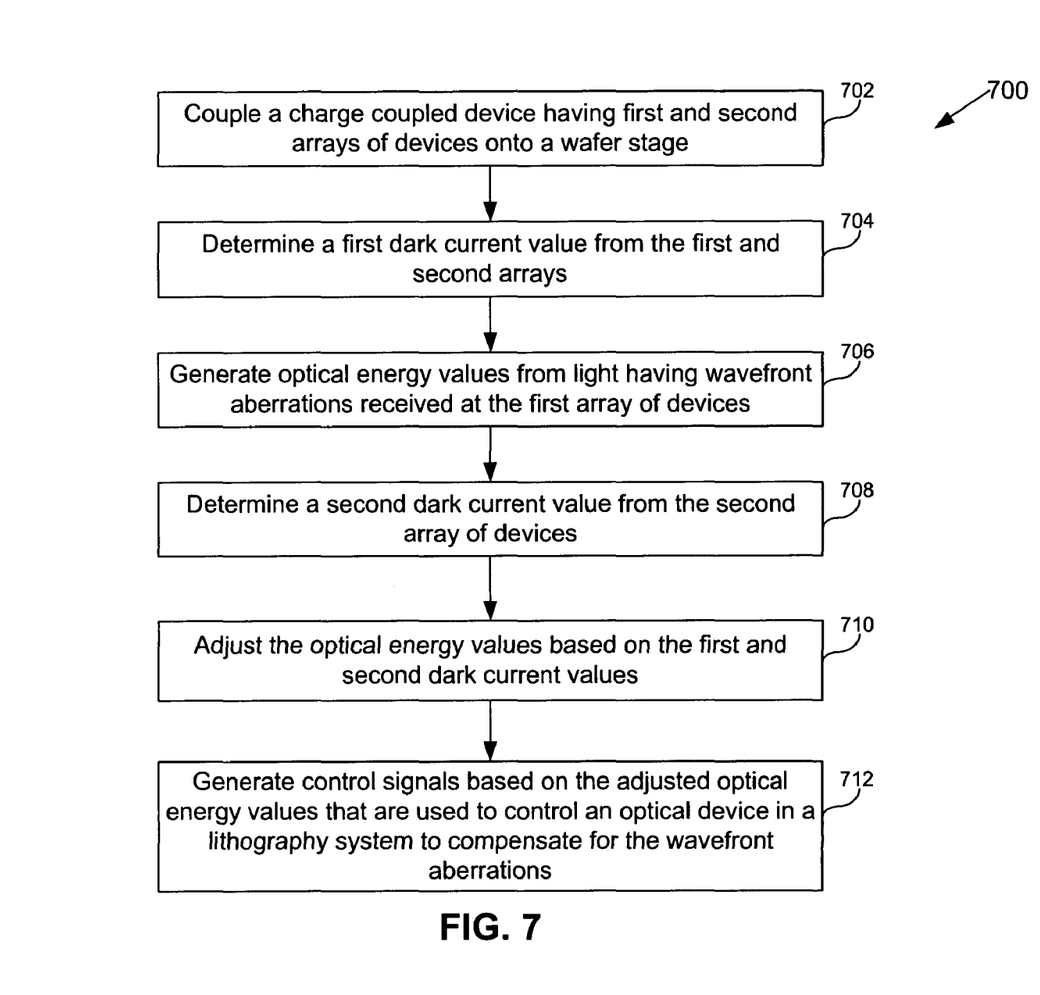
FIG. 7 shows a flowchart depicting a method according to embodiments of the present invention.

FIG. 7 shows a flowchart depicting a method 700 according to embodiments of the present invention. Method 700 can take place in processing system 116, or remote from system 600. In step 702, a charge-coupled device having first and second arrays of devices is coupled in an optical path, possibly onto a wafer stage. In step 704, a first dark current value can be determined using the second array of devices. In step 706, optical energy values are generated from light having the wavefront aberrations received at the first array of devices. In step 708, a second dark current value is determined from the second array of devices. In step 710, the optical energy values are adjusted based on the first and second dark current values. In step 712, possibly through use of software algorithms, control signals are generated based on the adjusted optical energy values. The control signals are used to control an optical device in lithography system 600 to compensate for the wavefront aberrations.

As was discussed above, other example embodiments can include and consumer or commercial grade still or video camera that may need to compensate being in a low light level environment. It is the be appreciated, still other uses of a CCD having the above described dark current compensation are also contemplated with the scope of the present invention.

CMOS Sensors

Figure 8:
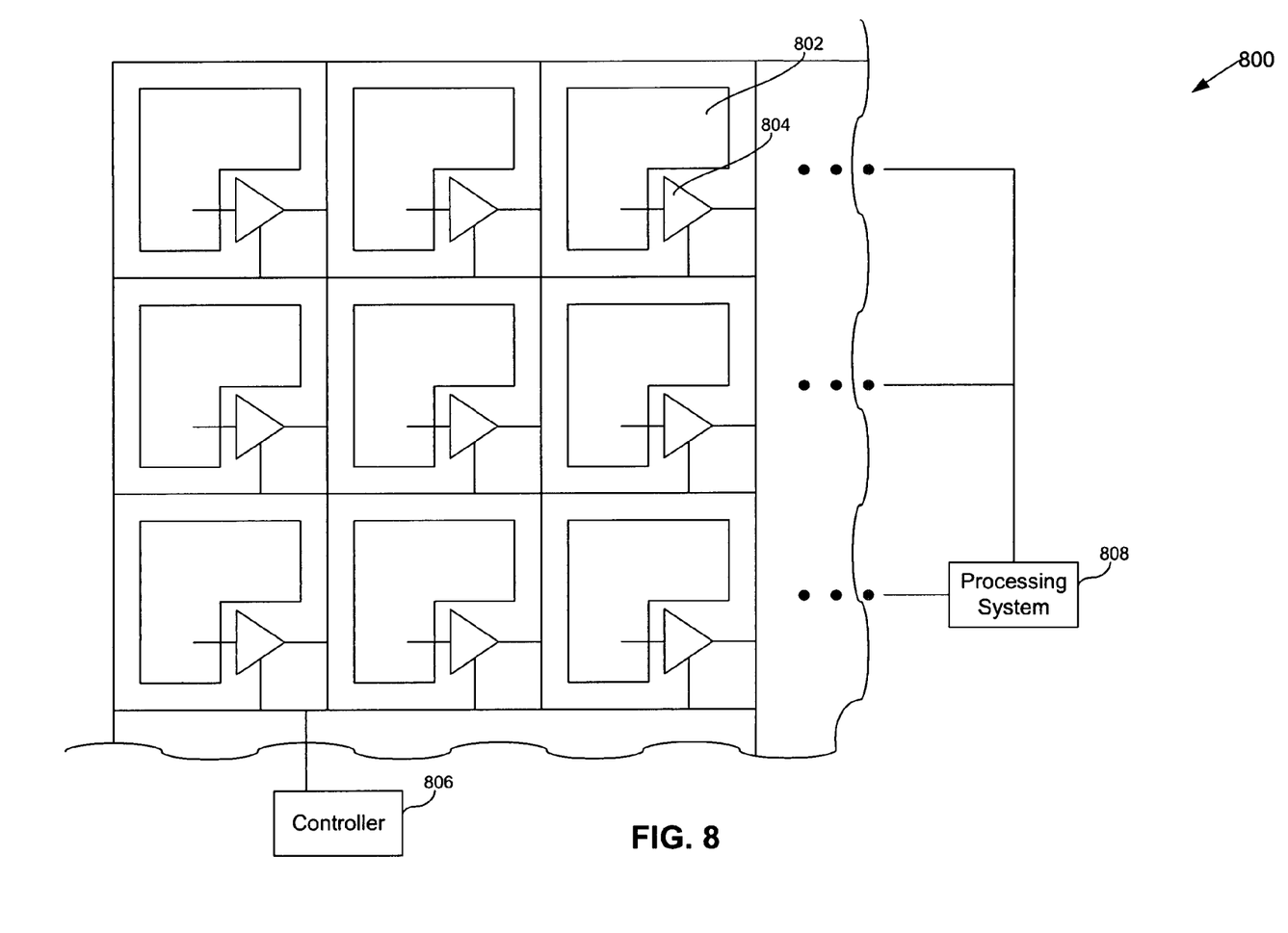
FIG. 8 shows a section of a CMOS sensor according to embodiments of the present invention.

FIG. 8 shows a section of a sensor 800 (e.g., a complimentary metal oxide semiconductor (CMOS) sensor) according to an embodiment of the present invention. CMOS sensor 800 includes photosensitive areas 802 coupled to amplifiers 804. A controller 806 controls amplifiers 804 via control lines. Light impinging on photosensitive areas 802 generates signals that are amplified by amplifiers 804 and transmitted to a processor 808. Processor 808 is used to processed signals from amplifiers 804 similar to as described above for CCD sensors.

CMOS 800 is mere an example CMOS architecture, and not meant to limit the scope of the present invention. It is to be appreciated that all other known and future CMOS architectures are contemplated within the scope of the present invention, as would be know to one of ordinary skill in the relevant arts. Each CMOS can be configured to have the second section of non-sensitive devices, as is described above.

Chips that include CMOS sensor 800 can also incorporate other circuits adjacent CMOS sensor 800. This allows for additional on-chip features to be easily added at low cost. This usually allows a camera including CMOS sensor 800 to be smaller than a camera including a CCD sensor and allow it to require less power. Another feature of CMOS sensors is that they can switch between still and moving image capture during operation without stopping the operation. They are less effective in low light situations as compared to outdoor situations.

However, using the above-described dark current technique, this can be substantially overcome. Further, the above-described dark current compensation technique can allow for continuous dark current compensation during each image capture period. For example, a set of photosensitive areas 802 could be made non-sensitive, as described above, which would allow for dark current values to be determined during each imaging period.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
   (a) determining a first dark current value from a first and second array of photosensitive devices;
   (b) receiving optical energy onto the first array of photosensitive devices;
   (c) determining an optical energy value for each element of the the first array based on the received optical energy;
   (d) determining a second dark current value from the second array of devices at substantially a same time as step (c), the second array of devices being non-sensitive to the optical energy; and
   (e) adjusting the optical energy value as a function of the first and second dark current values.

2. The method of claim 1, further comprising forming the first and second array of devices as a charge coupled device.

3. The method of claim 1, further comprising forming the second array of devices along a peripheral edge of the first array of devices.

4. The method of claim 1, further comprising determining aberrations in a wavefront producing the optical energy based on the optical energy value.

5. The method of claim 4, further comprising generating a control signal base on the adjusted optical energy value, the adjusted optical energy value being used to correct for the aberrations.

6. The method of claim 1, further comprising coupling the first and second arrays of devices to a stage in a lithographic system.

7. The method of claim 1, further comprising coupling the first and second arrays of devices to a wafer stage.

8. A method of claim 1, further comprising using step (e) to compensate for low light levels during step (c).

9. The method of claim 1, further comprising forming two-dimensional array as the first array.

10. The method of claim 1, further comprising forming a one-dimensional array as the second array.

11. The method of claim 1, further comprising using full-frame architecture technology to perform at least one of steps (a), (c), and (d).

12. The method of claim 1, further comprising using interline architecture technology to perform at least one of steps (a), (c), and (d).

13. The method of claim 1, further comprising using frame-transfer architecture technology to perform at least one of steps (a), (c), and (d).

14. A method for compensating for dark current in a charge coupled device, comprising:
   (a) determining a first dark current value from a first and second portion of the charge coupled device;
   (b) determining optical energy values from the first portion of the charge coupled device correlating to received optical energy;
   (c) determining a second dark current value based on the second portion of the charge coupled device at substantially a same time as step (b), the second portion being non-sensitive to the optical energy; and
   (d) adjusting the optical energy values as a function of the first and second dark current values.

15. A method for correcting for wavefront aberrations in a lithography system having a wafer stage comprising:
   scanning a charge coupled device having first and second arrays of devices located on the wafer stage;
   determining a first dark current value from the first and second array of devices;
   generating optical energy values from light having the wavefront aberrations received at the first array of devices;
   determining a second dark current value from the second array of devices;
   adjusting the optical energy values as a function of on the first and second dark current values; and
   generating control signals on the adjusted optical energy values that are used to control an optical device in the lithography system to compensate for the wavefront aberrations.

16. The method of claim 15, further comprising providing the second array of devices that are non-sensitive to the light.

17. The method of claim 15, further comprising determining the second dark current value at substantially a same time as the optical energy is generated.

18. The method of claim 15, further comprising performing the generating step during scanning of the CCD.

19. The method of claim 15, further comprising using full-frame architecture technology, interline architecture technology, or frame-transfer architecture technology to perform at least one of the generating optical energy and determining dark current steps.

20. The method of claim 15, further comprising generating a Zernike polynomial based on the optical energy values, wherein the control signals are based on the Zernike polynomial.

21. The method of claim 1, wherein step (d) is performed each time step (c) is performed.

22. The method of claim 14, wherein step (c) is performed each time step (b) is performed.

23. The method of claim 15, wherein the second dark current value is determined each time the optical energy values are determined.

24. A system comprising:
   means for determining a first dark current value using a first and second array of devices means for receiving optical energy onto the first array of devices;

means for determining an optical energy value for each of the devices based on the received optical energy;

means for determining a second dark current value from the second array of devices at substantially a same time as the means for determining determines the optical energy values, the second array of devices being non-sensitive to the optical energy; and means for adjusting the optical energy value as a function of the first and second dark current values.

25. A system that corrects for wavefront aberrations in a lithography tool having a wafer stage comprising:

a charge coupled device having first and second arrays of devices located on the wafer stage;

means for determining a first dark current value from the first and second array of devices;

means for generating optical energy values from light having the wavefront aberrations received at the first array of devices;

means for determining a second dark current value from the second array of devices;

means for adjusting the optical energy values as a function of the first and second dark current values; and means for generating control signals based on the adjusted optical energy values that are used to control an optical device in the lithography tool to compensate for the wavefront aberrations.

26. A method of claim 1, wherein the adjusting step comprises determining a percentage change between the first and second dark current values.

27. A method of claim 14, wherein the adjusting step comprises determining a percentage change between the first and second dark current values.

28. A method of claim 15, wherein the adjusting step comprises determining a percentage change between the first and second dark current values.

29. The method of claim 1, further comprising forming the first and second array of devices as a complementary metal oxide semiconductor device.

30. A method for compensating for dark current in a complimentary metal oxide semiconductor device, comprising:

(a) determining a first dark current value from a first and second portion of the charge coupled device;

(b) determining optical energy values from the first portion of the charge coupled device correlating to received optical energy;

(c) determining a second dark current value based on the second portion of the charge coupled device at substantially a same time as step (b), the second portion being non-sensitive to the optical energy; and (d) adjusting the optical energy values as a function of the first and second dark current values.

* * * * *